Sept. 9, 1958 V. SHANOK ET AL 2,851,207
LEDGE GUARD
Filed Nov. 10, 1955
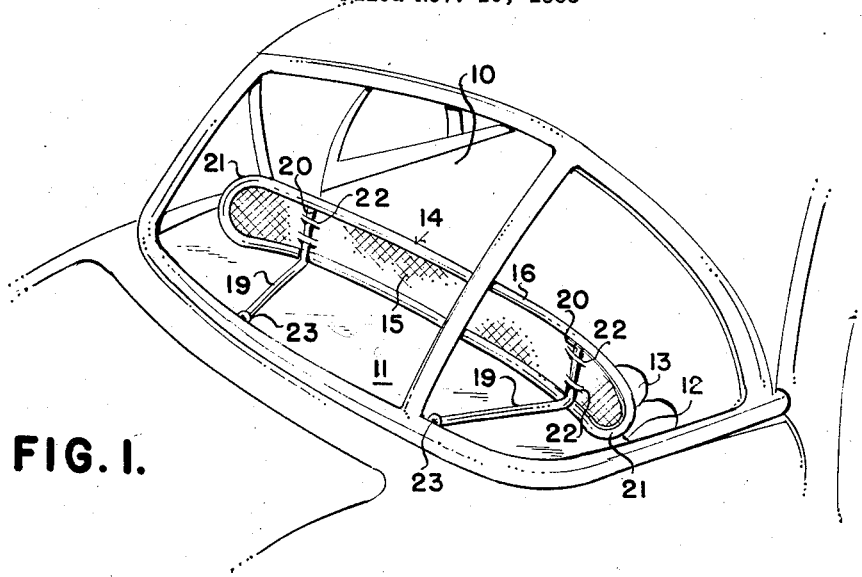
FIG. 1.
FIG. 2.
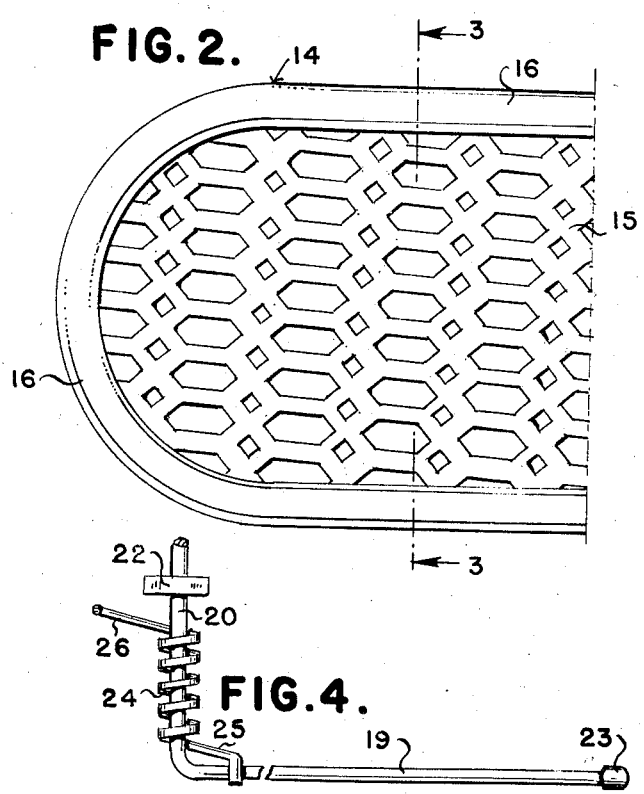
FIG. 4.
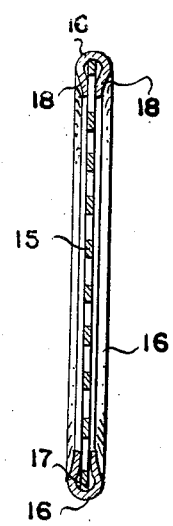
FIG. 3.
VICTOR SHANOK
JESSE SHANOK
INVENTORS.
BY Abraham Friedman
Atty.

United States Patent Office 2,851,207
Patented Sept. 9, 1958

2,851,207
LEDGE GUARD
Victor Shanok and Jesse Shanok, Brooklyn, N. Y.
Application November 10, 1955, Serial No. 546,184
6 Claims. (Cl. 224—42.42)

This invention relates to a guard and more particularly to a guard adapted to be positioned along the ledge or deck adjacent the rear window of an automobile.

It is almost universal practice in the manufacture of passenger automobiles to provide a ledge or deck adjacent the rear window of the vehicle and extending from the top of the back rest of the rear seats to the bottom of the rear window. In use passengers often find it convenient to place articles, packages or parcels upon this ledge. This practice results in an unsafe condition in that there is a tendency for any package, parcel or article resting upon said ledge to be projected forwardly when, for any reason, the automobile is suddenly decelerated or brought to a stop. Under these conditions the article or package is projected forwardly and often times strikes the head of the passenger or the floor of the vehicle.

It is therefore an object of this invention to provide a guard rail which is adapted to be positioned along the leading edge of the aforesaid ledge or deck and to act as a safety stop for any article or package which may have been deposited on the ledge and thus prevent injury to passengers or breakage of the article.

It is a further object of this invention to provide a guard rail of the character indicated which may be readily positioned along the leading edge of a ledge, as heretofore described, and which may be secured in said position to a wide variety of the ledge arrangements and dimensions.

Another object of this invention is to provide a guard rail of the character indicated which may be, if desired, installed without the use of tools or other attaching devices and which will be safely and securely retained in said position in spite of sudden deceleration or stoppage of the vehicle to thereby prevent any package or article positioned on said ledge from being projected against a passenger.

It is also an object of this invention to provide a lightweight easily installed and economically fabricated ledge guard of the character indicated which will not materially interfere with or impede the rear vision of the operator of the vehicle and which will materially enhance the ornamental appearance or decor of the car interior.

Other and further objects, benefits and advantages of this invention will become apparent from the description thereof contained in the annexed drawings, specifications and claims or will otherwise become obvious. It will be understood that the invention herein disclosed may be employed for other purposes for which the parts, structure and arrangement are adapted.

In the accompanying drawings:
Figure 1 is a perspective view of a guard rail in accordance with the present invention showing the guard rail installed along the rear ledge of an automobile;
Figure 2 is a fragmentary front elevational view of an end portion of the guard rail;
Figure 3 is a cross-section taken along line 3—3 of Figure 2; and
Figure 4 is an elevational view of a modified form of securing bracket arm for the guard rail.

Figure 1 illustrates the rear portion of a passenger automobile having a rear window 10 which is inclined toward the front of the vehicle. At the base of the rear window 10 there is customarily provided a horizontally disposed ledge 11 which extends transversely across the rear portion of the interior of the car. The leading edge 12 of ledge 11 abuts the rear of the back rest 13 of the rear seat of the vehicle. It should be noted at this point that in the majority of vehicles the rear ledge abuts the back rest of the rear seat at a point somewhat below the top edge of the rear seat so that the top of the back rest projects slightly above the surface of the ledge or deck 11.

As may be seen in Figures 1 and 2, a ledge guard 14 comprising the instant invention abuts the back rest 13 thereby enclosing the rear ledge 11 to prevent the accidental displacement of articles stored thereon.

The novel guard 14 comprises an elongated panel 15 shaped to generally fit the contour of the edge 12 and the back rest 13, having a foraminous or perforated body portion 15 framed with a peripheral molding strip 16. The foraminous body portion 15 may be formed from sheet metal, plastic, wood, woven wire or the like. The perforations through the material are of adequate size and distribution to provide a clear view to the rear of the vehicle.

As better seen in Figure 3, the trim or molding strip 16 is of a generally U-shaped cross-section with the peripheral edge 17 of the body portion 15 extending between the oppositely disposed open arms 18 of the strip. The strip 16 is securely connected to the body portion by reason of the inherent resiliency of arms 18 or it may, if desired, be secured in position by welding, pressfitting or the like.

The guard is further provided with a pair of bracket arms 19, each of which are swivelled to the panel at points spaced from the lateral sides 21 of the panel. The arms 19 each include a transverse upstanding leg 20 which is pivotally secured to the panel by a pair of bands 22 integral with the foraminous material. Said bands are advantageously formed by deflecting the material of the panel. At the opposite ends of the bracket arms 19, lugs 23 are provided adapted to abut the bottom of the rear window without injuring the window structure.

The bands 22 engage the legs 20 with sufficient pressure to securely retain the bracket and yet permit a pivoting motion of the arms 19 relative to the panel 15. By making the length of bracket arms 19 greater than the distance between the panel (adjacent the bands 22) and the rear window 11, the bracket arms 19 can be wedged between the panel and the window by pivoting the arms 19 to a position approximately perpendicular to the window surface. With the arms 19 in the wedged position, the lugs 23 will bear compressively against the window surface forcing the panel against the back rest 13. The lugs 23 are preferably covered with rubber to prevent damage to the window structure. However, other substances which will similarly cushion the contact between the bracket arms and the window may be used.

Thus when one desires to provide an enclosure about the rear ledge 11, the panel 15 is placed in abutment with the back rest 13 and the arms 19 pivoted towards the window 11, until sufficient pressure is created against the window to securely retain the upright position of the guard. Although the guard height is sufficient to prevent the displacement of articles from the ledge, it is not of sufficient dimension to cause a significant loss of vision through the rear window. Moreover, the perforated construction virtually eliminates any usual obstruction created by the guard. When the use of the guard is not required, it can readily be removed from its operative position by pivoting the arms 19 laterally away from the window relieving the retaining pressure. The arms can then be folded inwardly against the panel and the assembly stored conveniently on the ledge awaiting further use.

A modified bracket arm assembly is shown in Figure 4 to comprise the same general construction as depicted in Figure 1. However the modification includes a spring 24 which is coiled about the leg 20. The lower spring end 25 is secured or abutted against the arm 19 and the upper end 26 is fastened to the panel, thereby biasing the bracket arm towards the rear window. Thus when the guard is placed in position against the back rest 13, the bracket arms 19 will be pressed by the springs against the window to retain the guard securely between the window and the back rest.

It is now apparent that the disclosed guard provides an economical and efficient means for safely enclosing and retaining articles stored on the rear ledge of a vehicle without materially obstructing vision through the rear window. Moreover the device can be readily installed when desired or removed and conveniently stored when its use is not required.

Although the embodiments disclosed are preferred forms, it should be understood that many modifications involving, for example, changes in size, shape, material, etc. may be provided without departing from the contemplated inventive scope.

Having thus disclosed in detail the nature of the invention, a grant of Letters Patent is respectfully solicited for the novelty as defined in the following claims.

We claim:

1. A guard adapted to abut the vehicular seat back rest which adjoins the ledge adjacent the rear window of a vehicle to provide an enclosure for the said ledge comprising an elongated panel shaped to fit the contour of the back rest and formed of a perforated material permitting visibility therethrough, in combination with spring biased adjustable means adapted to wedge the panel in an upright position against the back rest spaced from the rear window, said means being movable to relieve the wedging action permitting removal of the guard from the said position.

2. A guard as in claim 1 wherein the means comprise a bracket reciprocally mounted on the panel adapted to engage the window in one position to press the panel securely against the back rest, and movable to another position not in contact with the window.

3. A guard as in claim 1 wherein the said means comprise a bracket pivotally secured to the panel and movable from a position spaced from the window to a second position in engagement with the window whereby the guard is securely wedged against the back rest.

4. A guard as in claim 1 wherein the said means comprise a bracket pivotally mounted on the panel and generally extending transversely from the panel, said bracket including terminal lugs movable from a position spaced from the window to a position in bearing contact with the window thereby securely locking the guard against the back rest.

5. A guard as in claim 1 wherein the said means comprise a bracket having one end pivotally secured to the panel and on opposite ends movable about the pivotal end towards and away from the panel, the said opposite end being adjustable to a position in bearing contact with the window thereby securely wedging the guard against the back rest, said opposite end being formed of a soft elastic material thereby preventing damage to the window.

6. A guard as in claim 1 wherein the said means comprise a pair of spaced bracket arms, said panel including spaced pairs of bands, said arms including transverse legs swivelly secured in the pairs of bands whereby the arms are pivotable about the legs towards and away from the panel, the ends of the arms remote from the legs including bearing lugs adapted to engage the rear window, said arms being movable to a position wherein the lugs are wedged against the window to force the guard against the back rest.

References Cited in the file of this patent
UNITED STATES PATENTS

| Number | Name | Date |
|---|---|---|
| D. 160,213 | Samuelson | Sept. 19, 1950 |
| 573,395 | Davis | Dec. 15, 1896 |
| 658,295 | Sullivan | Sept. 18, 1900 |
| 795,646 | Plummer | July 25, 1905 |
| 1,433,773 | Bersted | Oct. 31, 1922 |
| 1,493,289 | Speicher | May 6, 1924 |
| 1,946,633 | Meyer | Feb. 13, 1934 |
| 2,547,883 | Olson | Apr. 3, 1951 |
| 2,628,140 | Bunce | Feb. 10, 1953 |